(12) United States Patent
Maeshima et al.

(10) Patent No.: US 7,077,448 B2
(45) Date of Patent: Jul. 18, 2006

(54) SPARE TIRE RETAINING STRUCTURE

(75) Inventors: Kazuki Maeshima, Wako (JP); Ryuichi Murai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/196,057

(22) Filed: Aug. 3, 2005

(65) Prior Publication Data

US 2006/0028042 A1    Feb. 9, 2006

(30) Foreign Application Priority Data

Aug. 4, 2004    (JP)    ............................. 2004-227861

(51) Int. Cl.
   B62D 43/08    (2006.01)
(52) U.S. Cl. ................. 296/37.2; 296/37.8; 296/37.16; 296/187.11; 224/42.12
(58) Field of Classification Search ............... 296/37.1, 296/37.2, 37.8, 37.16, 187.11, 187.12; 224/42.12, 224/42.24, 42.29
   See application file for complete search history.

(56) References Cited

U.S. PATENT DOCUMENTS

| | | | | |
|---|---|---|---|---|
| 2,109,665 A | * | 3/1938 | Fergueson | ................. 296/37.2 |
| 2,823,068 A | * | 2/1958 | Walker | ........................ 296/37.2 |
| 3,940,178 A | * | 2/1976 | Leveque | ..................... 296/37.2 |
| 4,106,681 A | * | 8/1978 | Bott | ......................... 224/42.12 |
| 4,434,919 A | * | 3/1984 | Flowers | .................... 224/42.21 |
| 4,509,789 A | * | 4/1985 | Bogosoff | .................... 296/37.2 |
| 5,671,963 A | * | 9/1997 | Kanamori et al. | ......... 296/37.2 |
| 6,039,226 A | * | 3/2000 | Brown et al. | ............. 224/42.24 |
| 6,082,803 A | * | 7/2000 | Klueger | ..................... 296/37.2 |
| 6,427,885 B1 | * | 8/2002 | Dexel | ...................... 224/42.24 |

FOREIGN PATENT DOCUMENTS

JP    11-011359    1/1999

* cited by examiner

Primary Examiner—D. Glenn Dayoan
Assistant Examiner—Greg Blankenship
(74) Attorney, Agent, or Firm—Rankin, Hill, Porter & Clark LLP

(57) ABSTRACT

A structure for retaining a spare tire at a sidewall of a rear body of a vehicle is disclosed. A vertically extending bracket is weld connected to an outer surface of an inner panel forming the sidewall. A rod extending through the inner panel into a luggage space is attached to a distal end of the bracket. The rod has a front end exposed to the luggage space for retaining the spare tire in an upright position. When a forwardly directed load arising from a collision in a rear of the vehicle is applied to the spare tire, the bracket is deformed through the rod to rupture the inner panel at the weld connection.

3 Claims, 10 Drawing Sheets

SPARE TIRE RETAINING STRUCTURE

FIELD OF THE INVENTION

The present invention relates to a structure for retaining a vehicle spare tire in an upright position along a sidewall of a vehicle rear body.

BACKGROUND OF THE INVENTION

A vehicle including in its rear body a storage section for storing a spare tire in a vertical position is proposed in Japanese Patent Laid-Open Publication No. 11-11359. The rear body with the storage section will be described with reference to FIGS. 10A and 10B hereof.

As shown in FIGS. 10A and 10B, the spare tire 103 is held upright by means of a flange 104 in a boot 102 provided in a rear part of the body 101. The flange 104 is attached to a side panel 106 of the body 101. A load transferring member 107 is attached to the flange 104.

When a rear end panel 108 encounters a collision from the rear, by a load coming from behind, as identified by arrow A, the load transferring member 107 causes the spare tire 103 to turn about the flange 104 in the direction of arrow B toward the side panel 106 to thereby make a rear side member 109 crush.

However, upon turning of the spare tire 103 as arrowed by B, the spare tire 103 interferes with the side panel 106, thus restricting the turning of the spare tire 103. Consequently, the amount of crush of the rear side member 109 is limited. Thus, a vehicle rear body structure with increased impact absorbing capability is demanded.

SUMMARY OF THE INVENTION

According to an aspect of the present invention, there is provided a structure for retaining a spare tire in a rear body of a vehicle, which comprises a side wall forming part of the rear body, the side wall being comprised of a an inner panel and an outer panel; a side frame interposed between the inner panel and the outer panel; a bracket extending from the side frame upwardly or downwardly in a cantilevered fashion; and a rod fixed to a distal end of the bracket and extending through the inner panel into a luggage space of the vehicle, the rod having a front end for retaining the spare tire, so that when a forwardly-directed load resulting from a collision in a rear of the vehicle is applied to the spare tire, the bracket deforms plastically while swinging to cause the rod to rupture the inner panel to thereby attenuate impact energy corresponding to the load.

With the spare tire retaining structure thus arranged, the spare tire retained in a vertical position by the sidewall can be advantageously moved in correspondence with the impact of the rear collision to attenuate the impact. It is also possible to move the spare tire to a large extent to absorb the collision impact.

Preferably, the bracket is provided with a weak portion at a mid-part of a length thereof. As a result, when a load is applied to the distal end of the bracket, the bracket deforms plastically from the weak portion as a starting point and eventually turns generally about the weak portion. Consequently, the spare tire is moved directly in correspondence with the impact from the rear collision to thereby absorb the impact with increased efficiency.

Desirably, the bracket is connected with the inner panel at at least one position by spot welding. A weld produced by spot welding the bracket to the inner panel can be used to rupture the inner panel in the vicinity of the weld to thereby move the spare tire directly in correspondence with the rear collision impact to absorb the impact.

BRIEF DESCRIPTION OF THE DRAWINGS

Certain preferred embodiments of the present invention will be described in detail below, by way of example only, with reference to the accompanying drawings, in which.

DETAILED DESCRIPTION OF THE PREFERRED EMBODIMENTS

Figure 1:
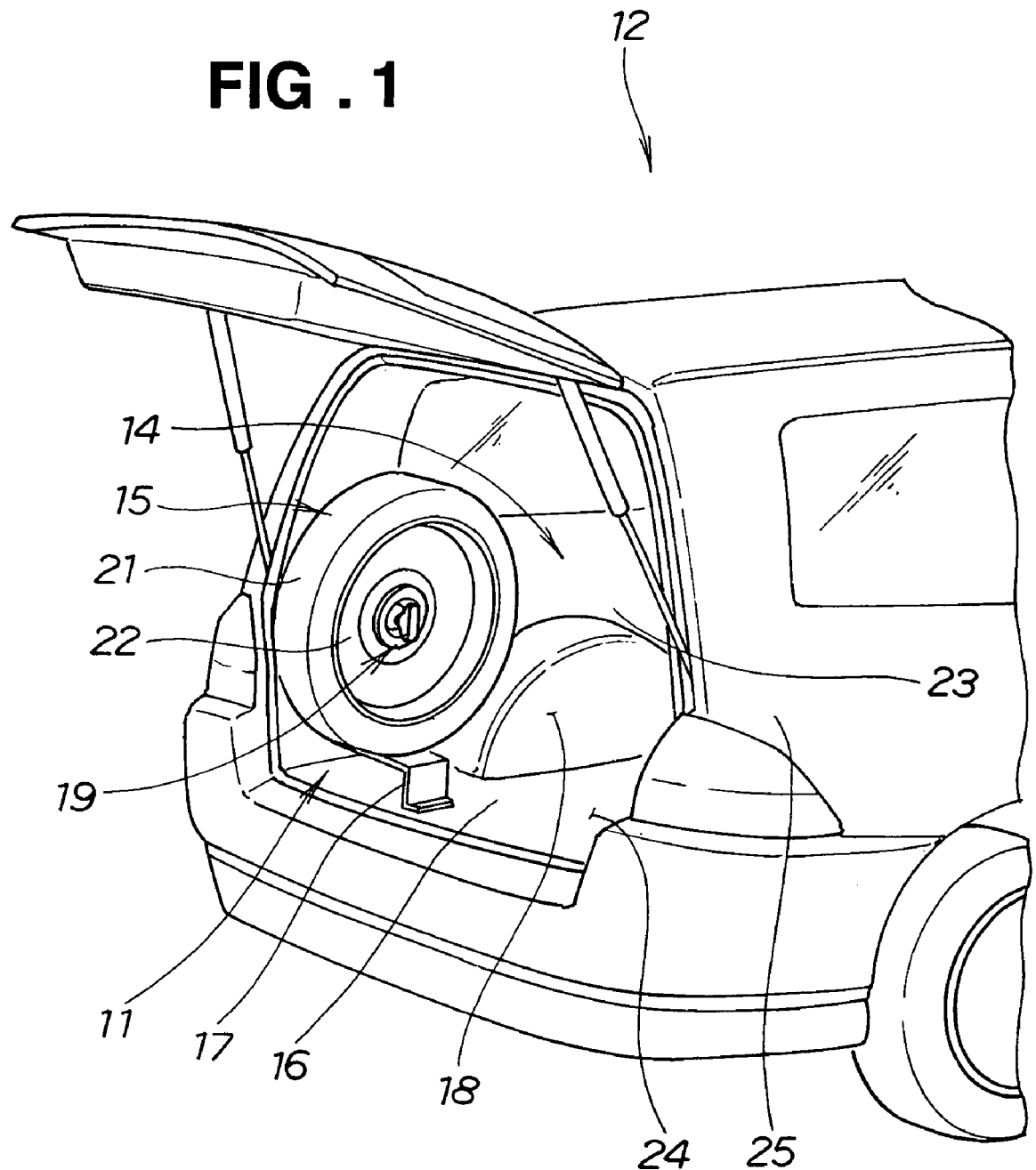
FIG. 1 is a perspective view illustrating a vehicle rear body storing in its storage section a spare tire.

Initial reference is made to FIG. 1 illustrating a vehicle 12 having luggage space 16 in a rear body part 25 of the vehicle. The luggage space 16 has a spare tire storage part 11 for storing a spare tire or wheel 15. The spare tire storage space 11 stores the spare tire 15 in a vertical position along a sidewall 14 of the rear body part 25. The spare tire 15 rests on a support member 17 and a wheel house 18 and is held by a wheel retainer 19. The spare tire 15 is comprised of a tire part 21 and a wheel part 22. The sidewall 14 is covered with a lining 23. An upper surface defining a bottom of the luggage space 16 is covered with a floor covering 24.

Figure 2:
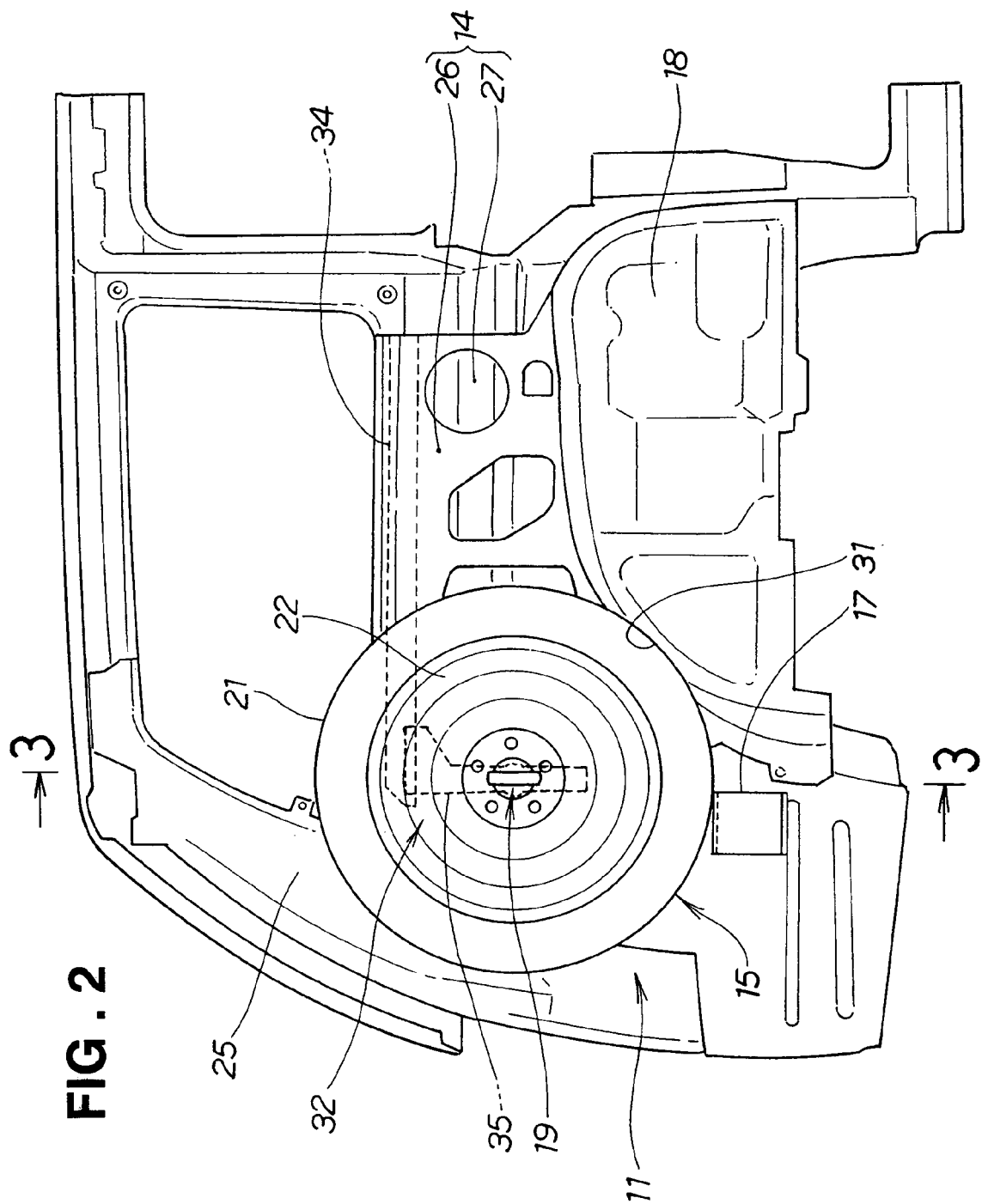
FIG. 2 is a schematic view illustrating a manner of storage of the spare tire as viewed from the luggage space shown in FIG. 1.
Figure 3:
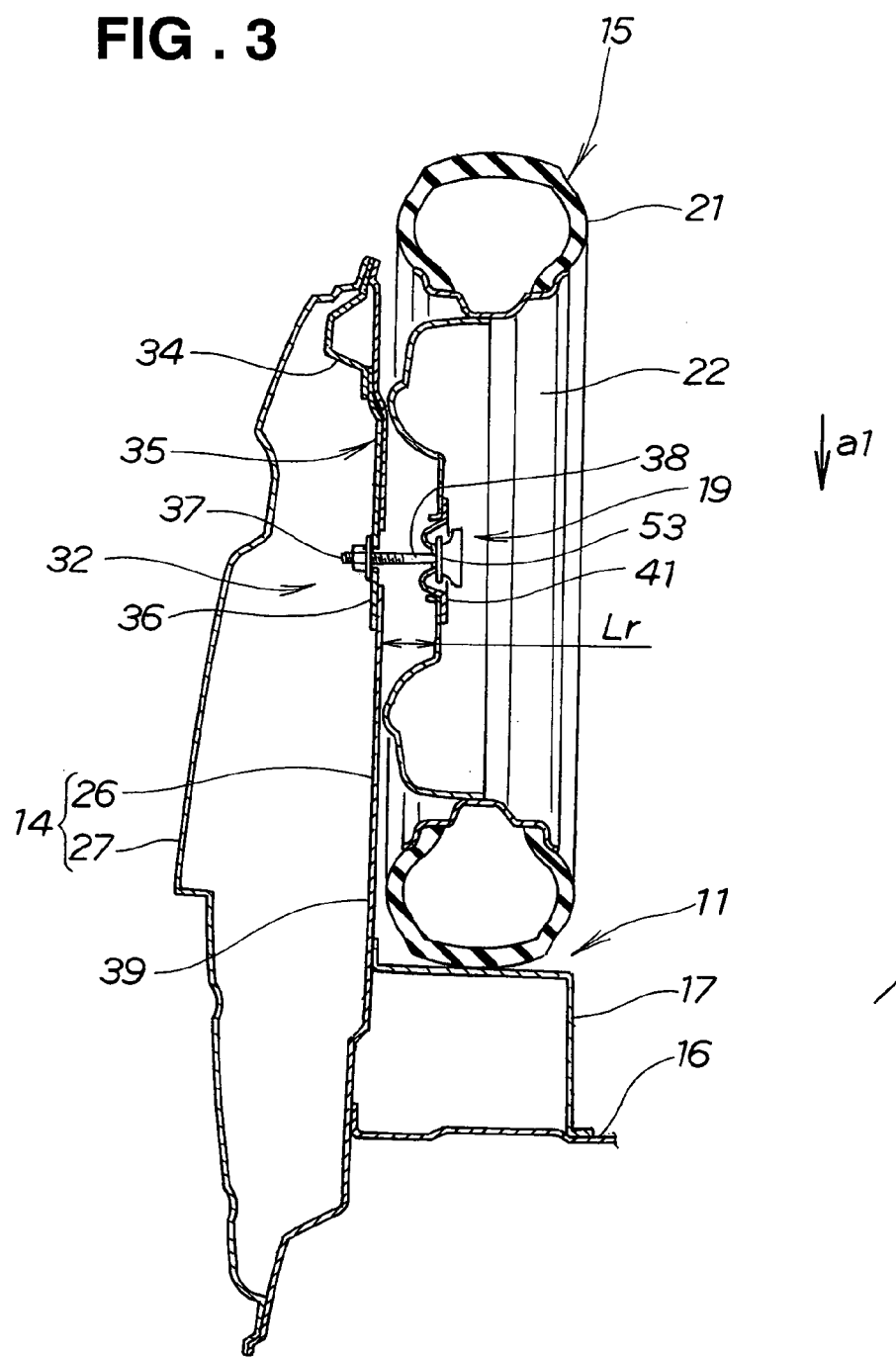
FIG. 3 is a cross-sectional view taken along line 3—3 of FIG. 2.

Referring to FIGS. 2 and 3, the sidewall 14 of the rear body part 25 is comprised of an inner panel 26 and an outer panel 27. The wheel house 18 is formed in the inner panel 26.

The spare tire storage part 11 is comprised of the support member 17, a positioning part 31 provided within the wheel house 18 and a spare tire retaining structure 32.

As shown in FIG. 3, the spare tire retaining structure 32 comprises a side frame 34 provided between the inner panel 26 and the outer panel 27, a bracket 35 mounted to the side frame 34 and the inner panel 26, and the wheel retainer 19 removably secured to the bracket 35.

The bracket 35 extends downwardly from the side frame 34 in a cantilevered fashion as shown by arrow a1. The bracket 35 has a distal end 36 with a rod 37 fixed thereto. The rod 37 passes through the inner panel 26 and projects a distance Lr from the inner panel 26 toward the luggage space 16. The spare tire 15 retained by a front part 38 of the projected part of the rod 37. Reference numeral 39 designates an outer surface of the inner panel 26.

In the embodiment of FIG. 3, the bracket 35 extends downwardly. The bracket 35 may be altered to extend upwardly. In this instance, the bracket may be positioned below the rod 37 to allow it to extend upwardly therefrom.

The wheel retainer 19 comprises a fitting or engaging member 41 to be fitted in a central part of the wheel part 22, and the rod 37 passed through the fitting member 41 and threadedly engaged with the distal end 36 of the bracket 35.

The distance Lr is a value resulted from mounting of the spare tire and spans from the inner panel 26 to fitting member 41 of a pressing member 53.

Figure 4:
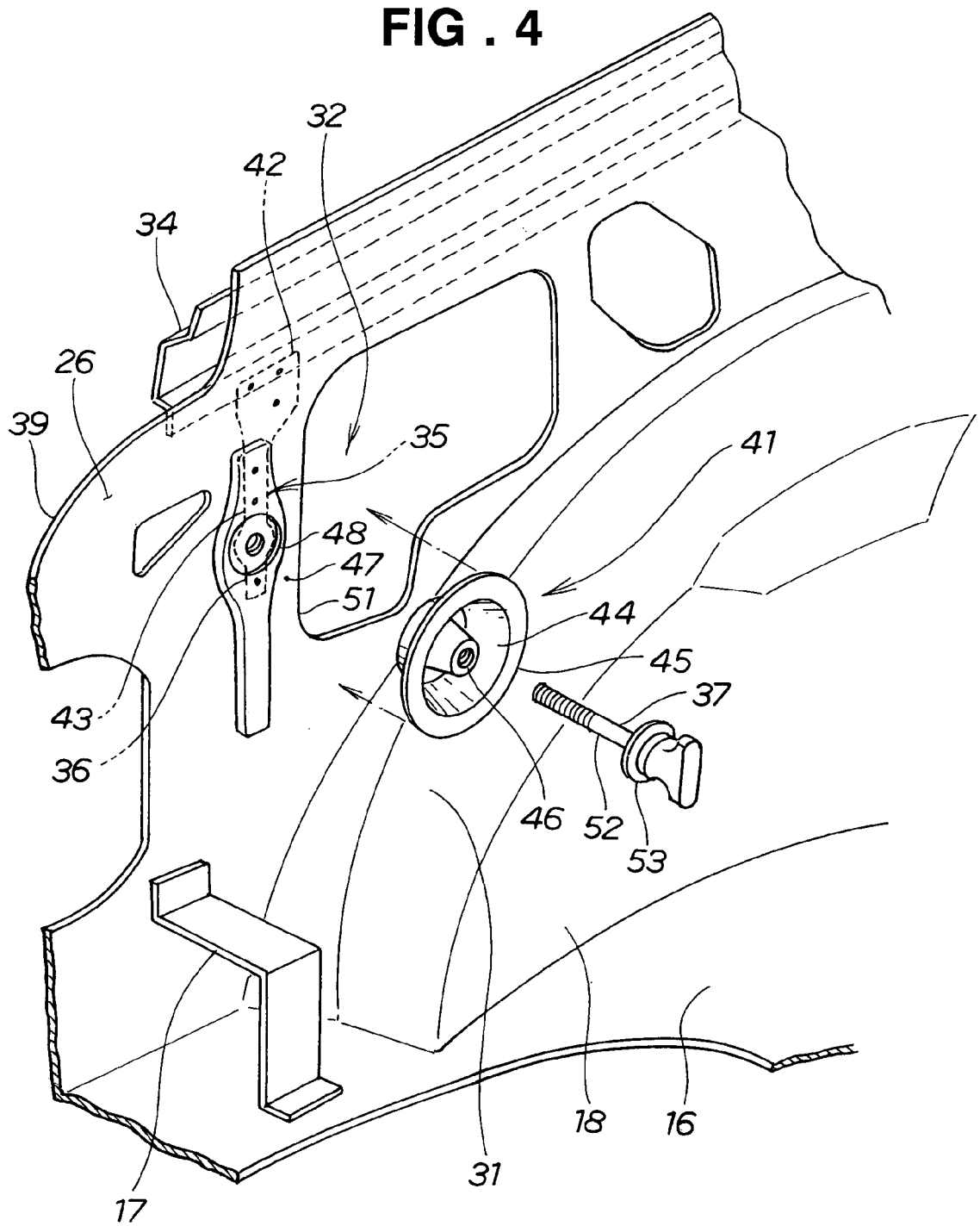
FIG. 4 is a perspective view showing a spare tire retaining structure, as viewed from the luggage space, according to the present invention.

Reference is made next to FIG. 4 showing the spare tire retaining structure 32 as viewed from the luggage space 16.

The bracket 35 of the spare tire retaining structure 32 has a first fixing portion 42 interposed between an outer surface 39 of the inner panel 26 and the side frame 34 and weld connected together with the outer surface 39 and the side frame 34. A second fixing portion 43 of the bracket 35 and the distal end portion 36 included in the second fixing portion 43 are weld connected with the outer surface 39 of the inner panel 26.

The fitting member 41 includes a conical portion 44 and a flange 45. The conical portion 44 has a diameter slightly smaller than a diameter of a hole formed centrally of the wheel part 22 (FIG. 3). The flange 45 is adapted to press the wheel part 22 in use. The conical portion 44 includes a rod hole 46 having a diameter slightly larger than a diameter of the rod 37.

Since the conical portion 44 of the fitting member 41 has the diameter set to be slightly smaller than the diameter of the central hole of the wheel part 22, an impact arising from a rear collision (collision in the back of the vehicle) is efficiently transmitted to the rod 37 and attenuated thereby. In addition, upon such a collision, the wheel part 22 is allowed to move longitudinally of the vehicle to further dampen or attenuate the impact.

The inner panel 26 has a first opening 48 formed in its spare tire retaining part 47 where the distal end 36 of the bracket 35 is positioned and a second opening 51 formed forwardly of the first opening 48.

The configurations of, the distance between and the number of the first and second openings 48, 51 are merely exemplary and not limited to those of the illustrated embodiment. Formations, e.g., bumps, may be provided between the first opening 48 and the second opening 51.

Part allowing for attachment of the bracket 35 may be configured arbitrarily. For example, a recessed part may be provided in that part and the bracket may be mounted to the bottom of the recessed part.

The rod 37 includes a bolt body 52 having at one end thereof the pressing member 53 for pressing the conical portion 44. The bolt body 52 is passed through the first opening 48 of the inner panel 26 and threaded into the distal end 36 to thereby fixedly hold the spare tire.

Figure 5:
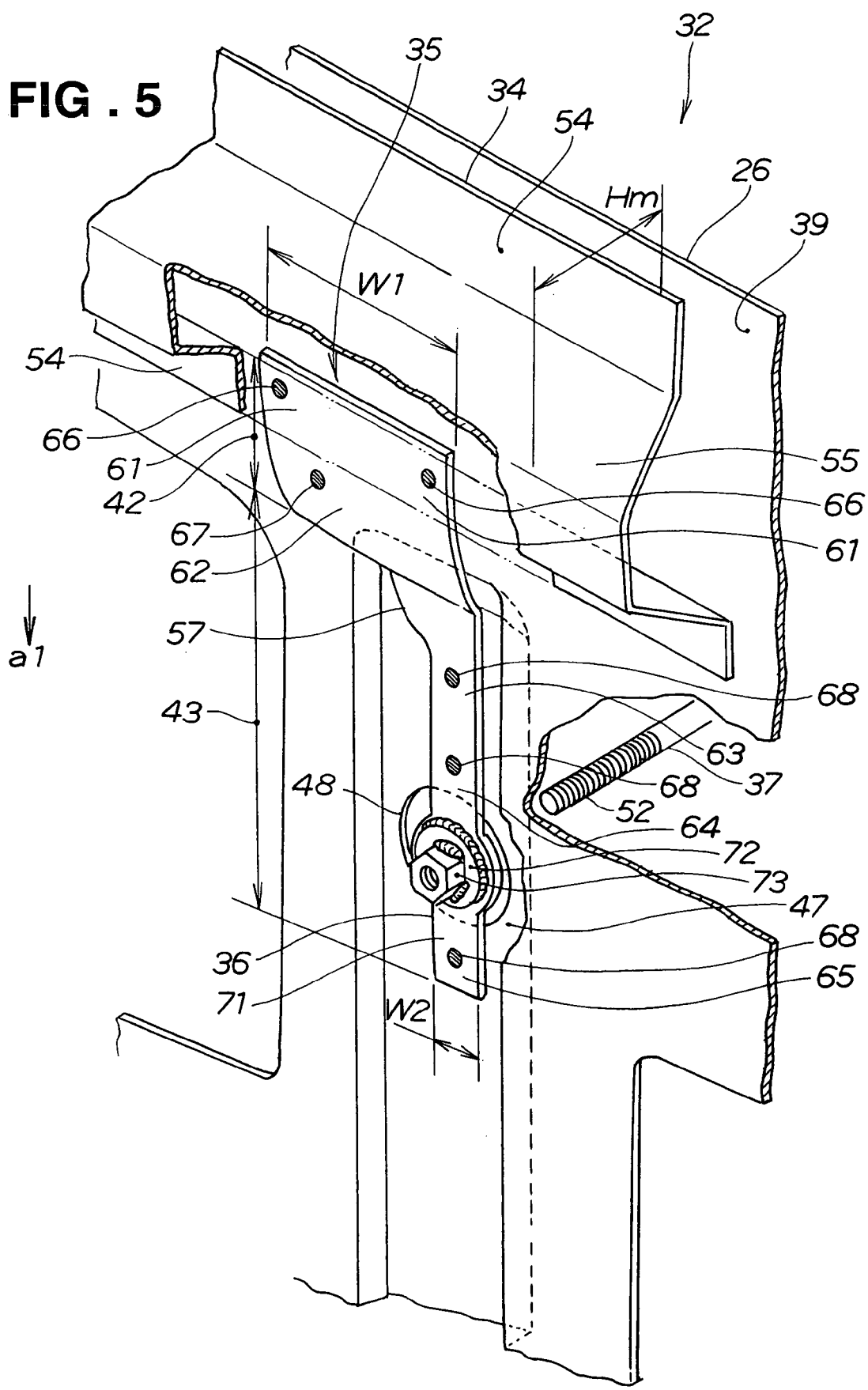
FIG. 5 is a perspective view showing the spare tire retaining structure as viewed from outside the vehicle.

Reference is now made to FIG. 5 showing the spare tire retaining structure 32 as viewed from outside the vehicle.

The side frame 34 includes mounting portions 54, 54 for mounting it to the inner panel 26, and a recessed portion 55 of generally U-shaped cross section. The recessed portion 55 has a depth of Hm.

As described above, the bracket 35 is comprised of the first fixing portion 42 held between the inner panel 26 and the mounting portions 54 of the side frame 34, and the second fixing portion 43 (including the distal end 36) to be fixed to the inner panel 26 continuously with the first fixing portion 42.

The bracket 35 further includes a weak or fragile portion 57 provided at a mid-part of its height as arrowed by a1, that is, between the first fixing portion 42 and the second fixing portion 43. The weak portion 57 is formed by making a width W2 of the second fixing portion 43 smaller than a width W1 of the first fixing portion 42 (W2<W1, e.g., W2=0.25×W1) so that a stress concentrates therein.

The bracket 35 is fixed at at least one position to the inner panel 26 by spot welding. More specifically, the first fixing portion 42 is sandwiched between the inner panel 26 and the side frame 34 and connected together at two first weld positions 61, 61 by plug welding, for example. The first fixing portion 42 is additionally connected at a second weld position 62 with the outer surface 39 of the inner panel 26 by spot welding, for example. The second fixing portion 43 is connected at three third weld positions 63, 64, 65 with the outer surface 39 of the inner panel 26 by, for example, spot welding.

Reference numeral 66 designates first welds provided at the first weld positions 61, 61; 67 designates a second weld provided at the second weld position 62; and 68 designates third welds provided at the third weld positions 63, 64, 65.

By the term "fixed at at least one position" mentioned above should be construed as connecting the second fixing portion 43 at at least one position, e.g., the third weld position 65, by spot welding to provide one third weld 68.

A reinforcing plate 72, having a central opening, not shown, for allowing passage of the bolt body 52, is connected by fillet welding with an outer surface 71 of the distal end 36. A nut 73 is fillet welded to the reinforcing plate 72 such that its hole is aligned with the opening of the plate 72. The rod 37 is threadedly engaged with the nut to retain the spare tire 15 (see FIG. 1). By providing the reinforcing plate 72, it becomes possible to prevent fall-out of the rod 37 from the nut 73 even when a load is applied to the rod 37 and the distal end 36 is broken.

Discussion will be made next as to an operation of the thus-arranged spare tire retaining structure in the vehicle rear part.

A case in which the second fixing portion 43 of the bracket 35 is not weld connected will be described first. In the spare tire retaining structure 32, when a load is applied to the spare tire 15 (FIG. 5) in a forward direction (as arrowed by a2 in FIG. 6) by a rear collision, the bracket 35 plastically deforms while swinging (in the direction of arrow a3 of FIG. 7). At the same time the rod 37 tears the inner panel 26 (as at 75 of FIG. 7) to thereby dampen the resultant collision energy.

Figure 6:
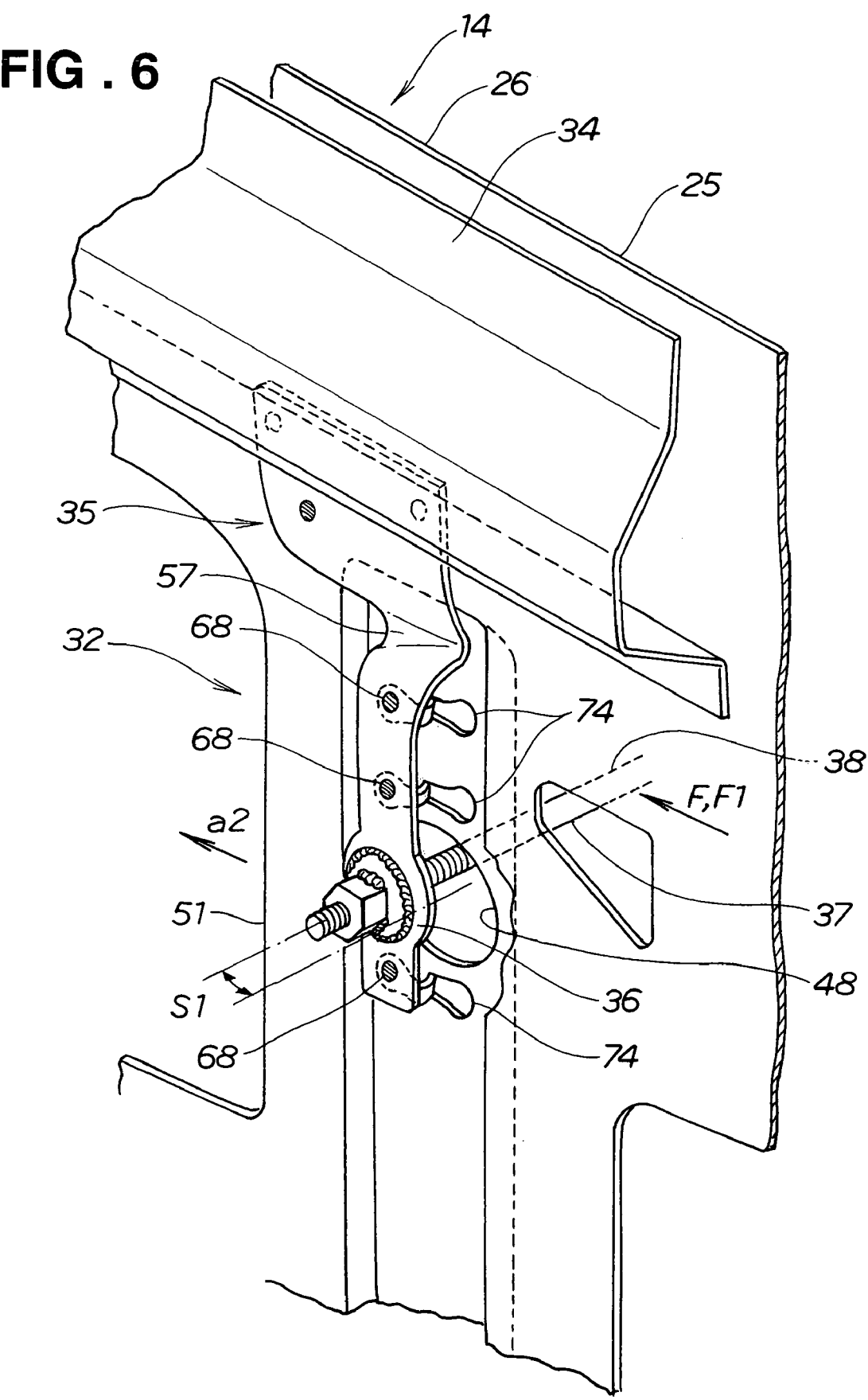
FIG. 6 is a perspective view corresponding to FIG. 5 but illustrating how the bracket moves when a load acts on the rod.

Next, discussion will be made as to a case wherein the second fixing portion 43 is weld connected to the inner panel 26. In the spare tire retaining structure 32, as shown in FIG. 6, when a load F resulted from a rear collision is applied to the spare tire 15 (FIG. 1) stored in a vertical or upright position along the sidewall 14, a forwardly directed load or force F1 acts on the rod 37 and onthe distal end 36 of the bracket 35. With the load acted on the distal end 36, the bracket 35 causes the distal end 36 to be displaced a distance S1 and deforms plastically, causing cracks or ruptures to arise in the base material of a companion member (inner panel 26), in the vicinity of the third welds 68. Consequently, the spare tire 15 held along the sidewall 14 (inner panel 26) of the rear body 25 can be moved directly, in correspondence with an impact arising from a back collision to absorb the impact.

Figure 7:
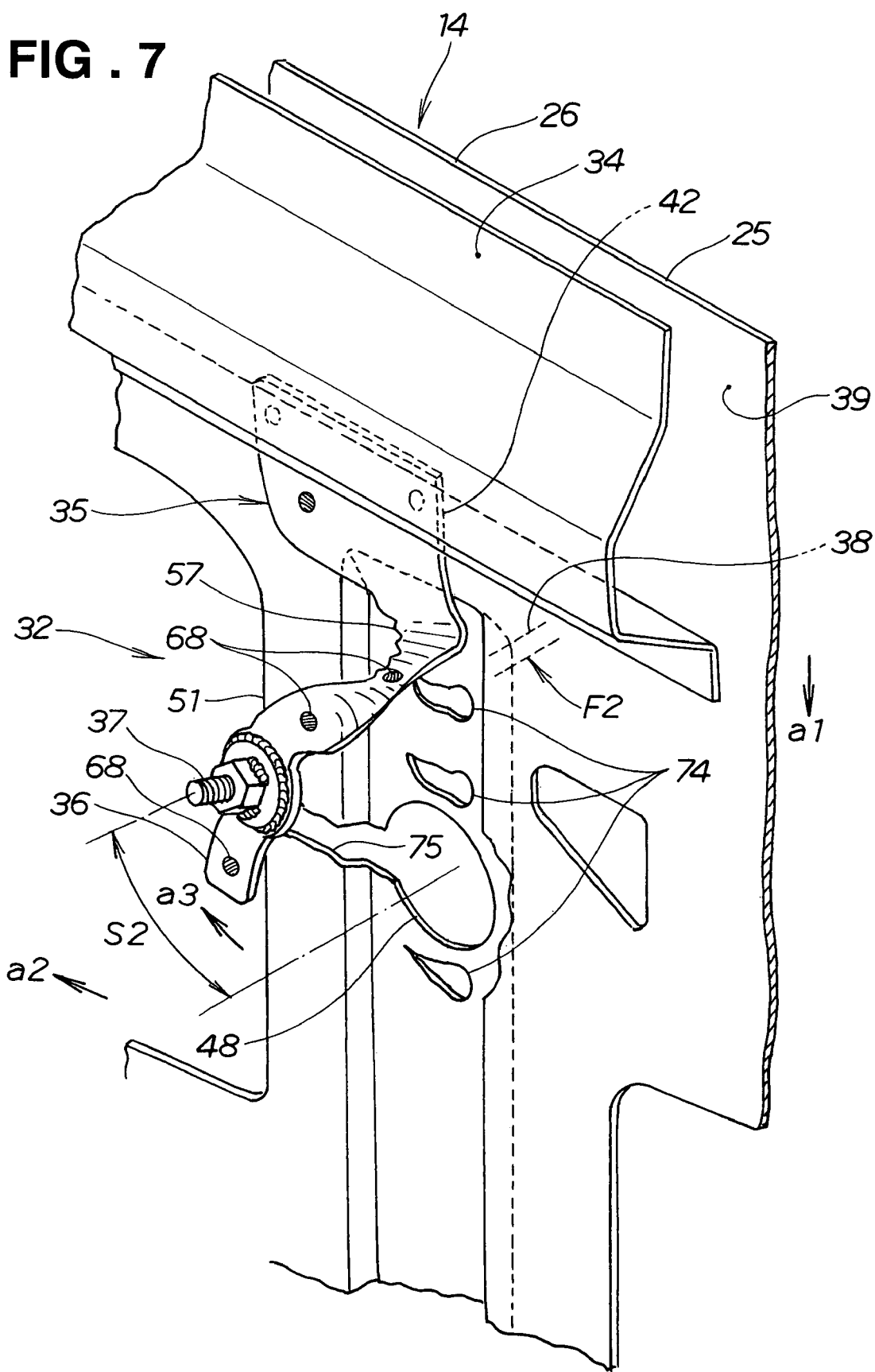
FIG. 7 is a perspective view illustrating a condition in which the rod, bracket and inner panel are placed when a collision force is applied to the spare tire.

Reference is now made to FIG. 7 explaining an operation of the spare tire retaining structure upon application of a larger load to the spare tire.

When an impact F2 too large (F2>F1) to be absorbed by displacement of the distance S1 and the cracks 74 formed in the inner panel 26 in the vicinity of the third welds 68, as shown in FIG. 6, is applied to the spare tire, the bracket 35 continues swinging in the direction of arrow a3 and deforming plastically to make the cracks 74 develop to eventually destroy parts of the inner panel 26 in the vicinity of the third welds 68. More specifically, the distal end 36 is displaced a distance S2, and part of the inner panel 26 spanning between the first opening 48 and the second opening 51 is torn by the rod 37 to produce a tear 75. Consequently, the spare tire 15 held by the inner panel 26 of the rear vehicle body can be moved directly in correspondence with an impact arising from a rear collision to thereby absorb the impact with increased efficiency.

Since the bracket 35 includes the weak portion 57 at a mid-part of its height, application of the load (F1 or F2) to the distal end 36 initiates plastic deformation at the weak portion 57 to eventually cause the bracket 35 to start turning from the weak portion 57 in the direction of arrow a3. As a result, the spare tire 15 is moved directly in correspondence with a rear collision impact.

By connecting the bracket 35 with the inner panel 26 with at least one spot weld, it becomes possible to produce the crack 74 or the tear 75 in the inner panel 26 in the vicinity of the third welds 68. The crack 74 or tear (rupture) in the vicinity of the third welds 68 causes the spare tire 15 to be moved in correspondence with a rear collision impact to thereby absorb the imp act.

In the spare tire retaining structure 32 according to the embodiment described above, the first fixing part 43 of the bracket 35 is held by the outer surface 39 of the inner panel 26 and the side frame 34 in a sandwiched fashion and these three sheet members are weld connected together. As a result, the first fixing part 42 of the bracket 35 has increased rigidity by virtue of the side frame 34. This further makes it possible for the bracket 35 to turn generally about the weak part 57 as arrowed by a3.

Figure 8:
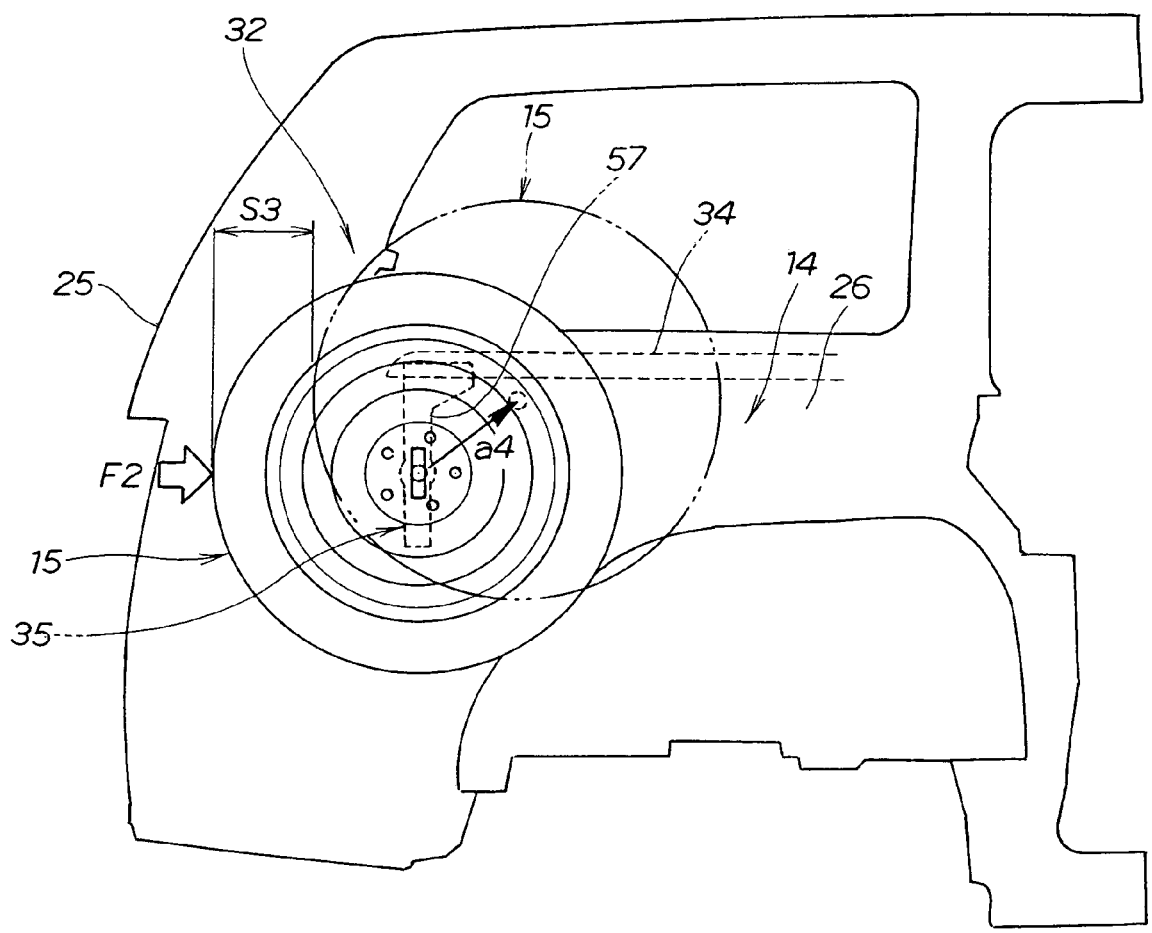
FIG. 8 is a schematic view illustrating movement of the spare tire upon application of a collision force to the tire.

Referring now to FIG. 8, discussion will be made as to a mode of movement of spare tire 15.

As discussed above, upon occurrence of a back collision, the bracket 35 starts turning from the weak portion 57 positioned below the side frame 34 and deforms plastically, thus causing the inner panel 26 to rupture. As a result, the spare tire 15 is moved a distance S3 in the direction of arrow a4. Consequently, upon a rear collision, the spare tire 15 held against the sidewall 14 (inner panel 26) of the rear body can be moved in correspondence with an impact of the rear collision for absorption of the impact.

Figure 9A:
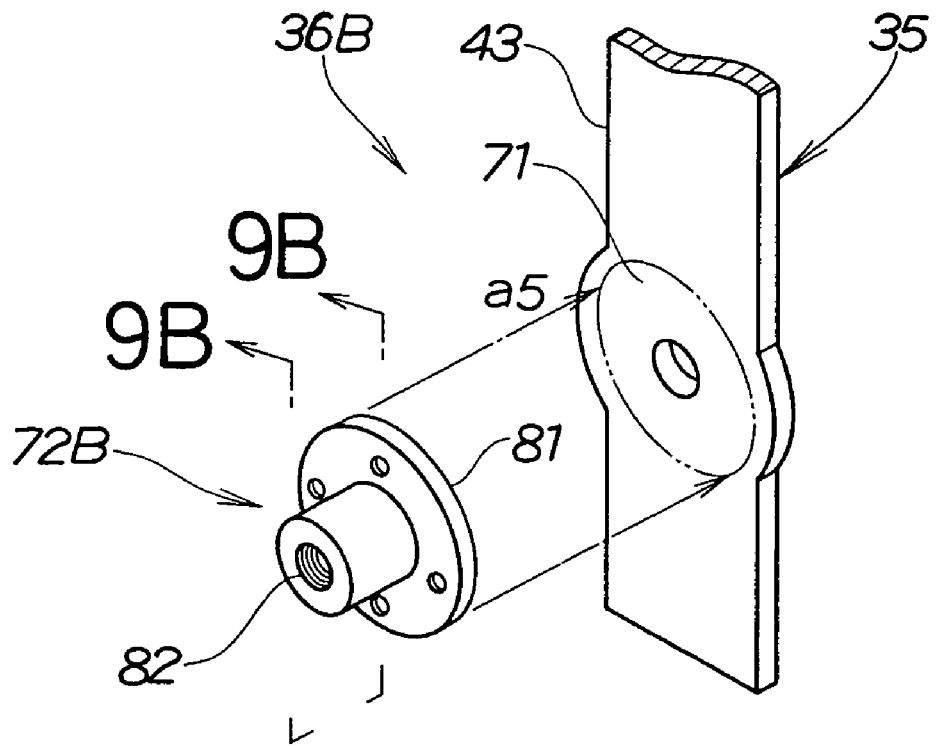
FIG. 9A is a perspective view illustrating an altered distal end of the bracket, whilst
Figure 9B:
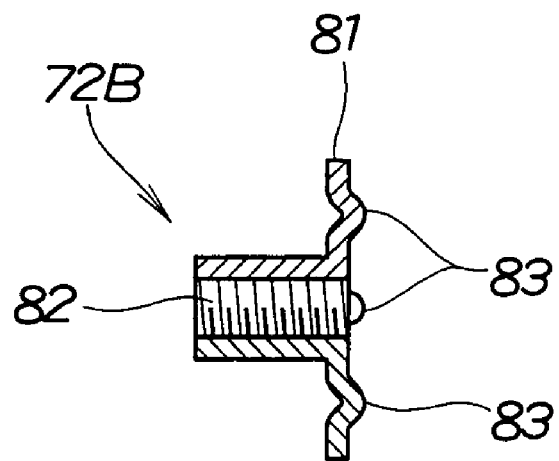
FIG. 9B is a cross-sectional view taken along line 9B—9B of FIG. 9A.
Figure 10A:
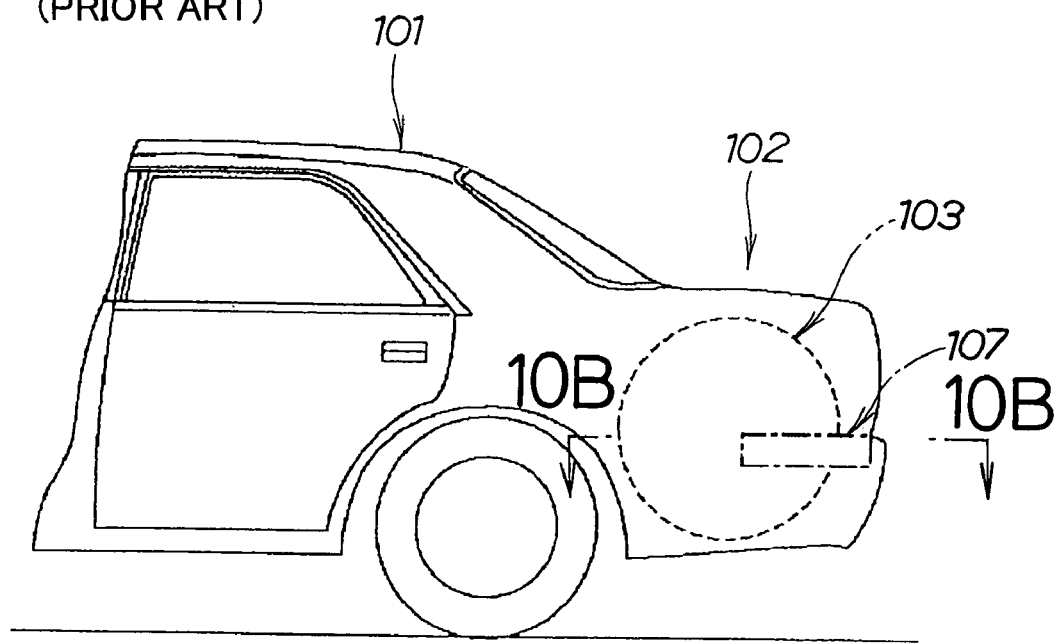
FIGS. 10A and FIG. 10B are schematic views illustrating a conventional spare tire retaining structure.
Figure 10B:
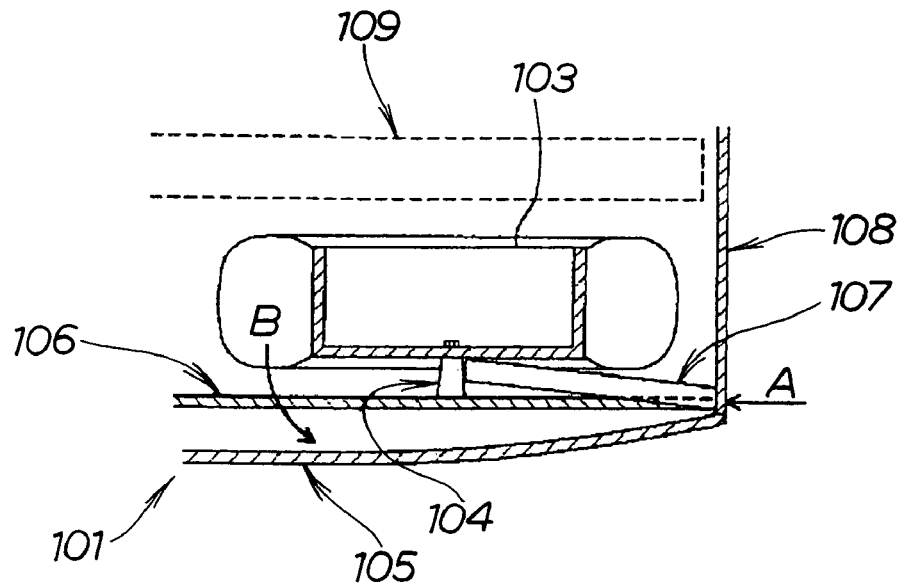

Referring to FIGS. 9A and 9B, discussion will be made next as to an altered distal end of the bracket 35.

A reinforcing plate 72B is mounted to an outer surface 71 of a distal end 36B, as indicated by arrow a5, by projection welding. The reinforcing plate 72B is comprised of a disc portion 81, a female thread portion 82 extending from the center of the disc portion 81 in a direction opposite from the surface to be welded, and a plurality of projections 83 formed on the to-be-welded surface of the disc portion 81. Since the projections 83 are thus projection welded to the outer surface 71, the reinforcing disc 81 and the female thread portion 82 can be assembled with the distal end 36B, enabling assemblage of the reinforcing plate 72B with the outer surface 71 with reduced man hours.

Although the spare tire retaining structure in accordance with the illustrated embodiment has been described as applied to a four-wheeled vehicle, it may also be applied to a three-wheeled vehicle.

Obviously, various minor changes and modifications of the present invention are possible in the light of the above teaching. It is therefore to be understood that within the scope of the appended claims the invention may be practiced otherwise than as specifically described.

What is claimed is:

1. A structure for retaining a spare tire in a rear body of a vehicle, comprising: a sidewall forming part of the rear body, the sidewall being comprised of an inner panel and an outer panel;

a side frame interposed between the inner panel and the outer panel;

a bracket extending from the side frame upwardly or downwardly in a cantilevered fashion; and a rod fixed to a distal end of the bracket and extending through the inner panel into a luggage space of the vehicle, the rod having a front end for retaining the spare tire, so that when a forwardly-directed load resulting from a collision in a rear of the vehicle is applied to the spare tire, the bracket deforms plastically while swinging to cause the rod to rupture the inner panel to thereby attenuate impact energy corresponding to the load.

2. The structure of claim 1, wherein the bracket has a weak portion at a mid-part of a length thereof.

3. The structure of claim 1, wherein the bracket is connected with the inner panel at at least one position by spot welding.

* * * * *